Dec. 13, 1955 E. G. ROEHM 2,726,581
TRACER CONTROLLED SAFETY DEVICE
Original Filed Oct. 1, 1949
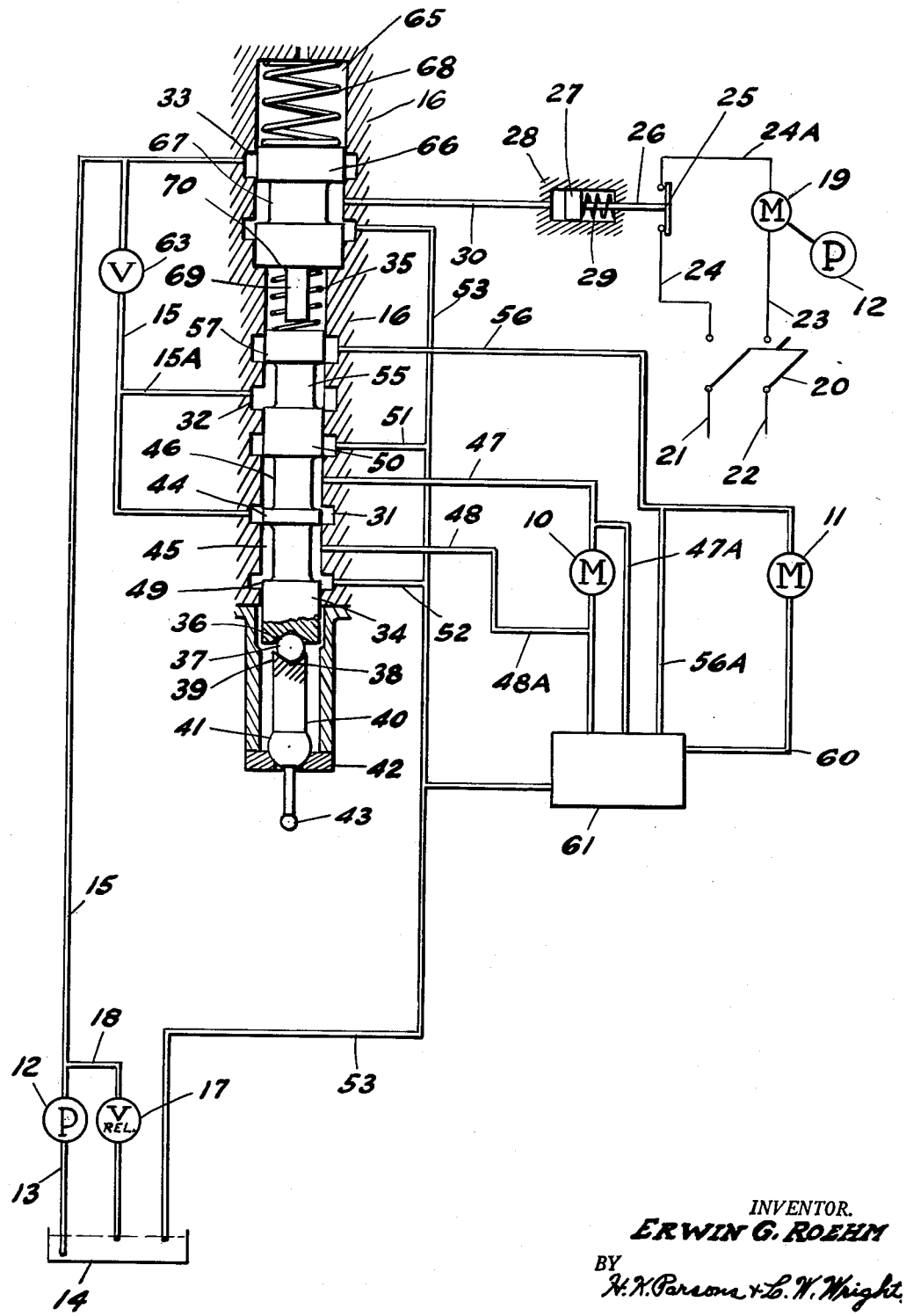
INVENTOR.
ERWIN G. ROEHM
BY
H. K. Parsons + L. W. Wright
ATTORNEYS

United States Patent Office 2,726,581
Patented Dec. 13, 1955

2,726,581

TRACER CONTROLLED SAFETY DEVICE

Erwin G. Roehm, Norwood, Ohio, assignor to The Cincinnati Milling Machine Co., Cincinnati, Ohio, a corporation of Ohio Original application October 1, 1949, Serial No. 119,185, now Patent No. 2,641,969, dated June 16, 1953. Divided and this application January 30, 1953, Serial No. 334,344

3 Claims. (Cl. 90—62)

This invention relates to improvements in machine tool control mechanisms and has particular reference to control mechanism for use in production of profiled or contoured surfaces in correspondence with a master or template and is a division of my co-pending application, Serial No. 119,185, filed October 1, 1949, now Patent No. 2,641,969, issued June 16, 1953.

The principal object of the present invention is the provision in connection with a plurality of actuating mechanisms for a machine tool slide and an automatic control therefor, of automatic safety means for rendering the several actuating means subordinate to a tracer control to prevent damage to the machine or undue stock removal from a work piece.

A further object of the invention is the provision in connection with a machine tool tracer control mechanism of an automatic safety device for stopping the power actuation of the machine on overdeflection of the tracer control mechanism.

Other obects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The drawing is a diagrammatic view of an embodiment of the tracer mechanism and the several circuits and mechanisms controlled thereby illustrative of the invention.

The structure of a machine in connection with which the present invention may be utilized is shown in my parent application, of which this is a division. Such a machine includes a first slide actuating hydraulic motor 10 for effecting movement of one of the machine tool slides and a second hydraulic motor 11 for effecting movement of another slide of the machine. Flow of hydraulic medium under pressure for actuation of these motors is produced by pump 12 having an intake conduit 13 extending into the reservoir 14 and a pressure conduit 15 extending to the valve casing or bushing 16. A variable relief valve 17 in the by-pass conduit 18 from pressure conduit 15 determines the maximum actuating pressure developed. The pump 12 has been indicated as driven by an electric motor 19 connectable by switch 20 to the power lines or conduits 21 and 22. Switch 20 forms a direct connection from the power line 22 to motor line 23 and a corresponding connection of power line 21 to line 24 which is coupled to the motor by way of a safety pressure switch 25 which may be of any standard commercial construction.

As illustrated, the switch has a rod 26 coupled to piston 27 movable in cylinder 28. A spring 29 normally holds the switch element 25 in closed or circuit completing position. Introduction of pressure into the left hand end of the cylinder, as indicated in the drawing, as through hydraulic conduit 30 will move the piston 27 to the right, thus breaking the circuit to motor 19 to stop the operation of the machine.

While for purposes of illustration the switch 25 has been shown in the line of the pump motor 19, it will be evident that the particular application of the safety device, whether for this or any other control circuit of a machine tool, is not of the essence of the present invention so long as the safety device reacts under tracer control to stop the machine and prevent damage to the machine or a work piece being operated upon.

The tracer housing 16, as illustrated, is provided with the inlet ports or grooves 31, 32, and 33 to which the pressure conduit 15 is coupled. Slidably mounted within the housing is the tracer valve member 34 urged downward by spring 35 and provided at its lower end with the cone seat 36 receiving ball 37 whose opposite face is fitted within the cone seat 38 or head 39 on the upper end of the tracer finger 40. This finger has intermediately secured thereon a ball or fulcrum 41 seated in the tracer shell or housing extension 42 and has at its outer end sufficient clearance to permit of rocking movement of the tracer 40 about the ball as a fulcrum while the shape of the seat is such as to permit longitudinal movement of the tracer finger upon terminal pressure against the tracer tip 43. The specific structural details of such a tracer finger for control of axial movement of a tracer valve in accordance with tilting or axial deflections of the tracer finger are illustrated and described, for example, in Roehm and Campbell Letters Patent 2,089,099 or Campbell Letters Patent 2,039,294, it being understood the particular type of tracer utilized, however, may be varied in accordance with present known and accepted practices. As is customary in tracer mechanisms of this type, the valve 34 has a spool portion 44 preferably slightly underlapped as respects the pressure groove 31 when the spool is in an intermediate position. This permits of potential flow from groove 31 to the chambers formed by the cannelures or grooves 45 and 46 of the valve so that pressure is maintained in both of these grooves, but the relative pressures may be varied by any slight axial movement of the valve to create a pressure differential in the output conduits 47 and 48. The valve 34 is provided with the additional spool portions 49 and 50 so related to spool 44 and to the outlet of reservoir connection portings 51 and 52 as inversely simultaneously to vary the resistance to discharge through one or the other of ports as respects the variation to resistance in flow into the associate valve groove and thus build up the pressure and potential flow in either line 47 or 48 while decreasing the resistance to discharge from the other of said lines. The discharge control conduits 51 and 52 are connected to the low pressure of reservoir return conduit 53 so that movement of the valve 34 controls flow into and through the valve housing to one of the conduits 47 or 48 and at the same time the flow from the other thereof back to reservoir.

Tracer control of motors 10 and 11

In the embodiment of the invention illustrated the tracer mechanism and circuits are interdependent and jointly react upon and control both the motor 10 for control of movement of a first slide and also motor 11 controlling the movement of a second slide. It is contemplated, however, in the utilization of the present invention that one of these motors shall be bi-directionally controlled or, in other words, automatically reversible to effect a back and forth or toward and from movement of the controlled slide while the other slide shall be unidirectional in operation and the control exerted thereon will be with respect only to its rate of movement in the selected direction or to a discontinuance of its movement in such direction.

With the tracer finger in its undeflected position, permitting downward movement of the tracer valve 34, the hydraulic medium under pressure will be forced by pump 12 through conduit 15 by way of the tracer valve groove 46, effecting rotation of hydraulic motor 10 in one direction. Deflection of the tracer finger 40 as by engagement with a pattern will reduce the rate of flow of pressure fluid, and thus actuation of the motor until the valve spool 44 is shifted to the hydraulic neutral or substantially central position with respect to groove 31 when the balanced pressure reactions in conduits 47 and 48 will stop operation of motor 10. Additional deflection of the tracer will effect a further movement of valve spool 44 so that the pressure medium will now flow into 48, reversing the direction of operation of motor 10.

Branching from conduit 15 intermediate rate valve 63 and the connection of conduit 15 to the tracer bushing or housing 16 is a pressure conduit 15A ported into a groove in the housing at 32. The valve 34 has a cannelure as at 55 for coupling 32 through the tracer housing to conduit 56 coupled with motor 11. The relative spacings of 32 and 56 and length of groove or cannelure 55 is such that when valve 34 is in a position of maximum downward deflection, as shown, the spool 57 blocks off into conduit 56, while when the tracer is in a position of substantial angular deflection, the resultant upward shifting of valve 34 causes spool 50 to block inlet porting 32. In intermediate positions of valve 34, however, the length of the cannelure 55 is such that a variable throttle is provided by the bounding spools 50 and 57 as respects the flow from 15 to 56, maximum flow taking place when the spool 44 is in its hydraulically neutral position such that the established pressure conditions lock motor 10 against rotative movement.

The return or exhaust flow from the motor 11 through conduit 60 is controlled by valving in block 61 corresponding to block 181 of my application, Serial No. 119,185, from which it is discharged to reservoir 14 through conduit 53. This valving, as disclosed in said application, is controlled by the pressure conditions existing in conduits 47 and 48 of motor 10, which have branches 47A and 48A coupled to the block, and by the pressure conduction in the forward pressure line 56 of motor 11 having the branch 56A coupled to the block.

*Safety stop mechanism*

To prevent damage to work, cutter, or machine in the event of threatened undue overdeflection of the tracer finger as by meeting a straight wall or other obstruction wherein relative rates or direction of operation of the slides will not properly free the same, there has been provided a special safety mechanism. This comprises the auxiliary valve chamber 65 formed in the tracer housing 16 and preferably axially aligned with the tracer valve 34. Slidable within this chamber is the valve 66 having the central groove 67 and urged downward as illustrated by the relatively heavy spring 68. The terminal portion of the valve 66 forms an abutment for the lighter tracer valve spring 35 extending axially within which is the pin or abutment 69 normally terminally spaced from the end of valve member 34. Overdeflection of the tracer finger 40, however, will cause sufficient axial movement of the valve 34 so that it will engage and mechanically shift pin 69 and thus raise valve 66. This movement upward will align groove 67 with the inlet port 33 from the main pressure conduit 15, serving in this position to couple 15 with the conduit 30 extending to a safety pressure switch unit 28 of conventional type into which extend the electrical leads 24 and 24A of the circuit for an actuating motor, such as 19, for the machine while closing off the connection to reservoir conduit 56. Pressure actuation of the switch will interrupt the motor circuit so that the entire actuating power will be shut off and the machine stopped on such mechanical overdeflecion of the tracer finger.

It will be noted that the diameter of the chamber 65 for the safety valve 66 has been indicated as having a diameter greater than the chamber for the valve 34, thus providing a shoulder at 70 against which the valve 66 is normally held tightly seated by the spring 68 in such position as to seal off the pressure inlet port or groove 33. Also, the length of the member 69 is sufficiently less than the space between the shoulder 70 and the upper end of valve 34 during any of its normal operative positions so that the valve 66 will remain fixed and undisturbed during normal functioning of the valve 34. Likewise, the spring 35 has less compression resistance than the spring 68. Normal operative movements of valve 34 will have no reaction effect through the spring 35 in movement of the valve 66, which is shiftable only when mechanically effected excess or pronounced movement of the valve 34 as by abnormal deflection of the tracer 40 is sufficient to take up the lost motion connection provided between member 69 and the valve 34. When this takes place the valve 66 is mechanically lifted to shut off the reservoir connection from 30 to 53 and connecting the pressure supply conduit 15 to the safety device control conduit 30.

Additionally, attention is invited to the fact that in the form of construction illustrated, as shifted, the valve 66 affords a direct connection between the main pressure conduit 15 and the safety device conduit 30, rendering the entire volume and pressure of pump 12 available quickly to react against the piston 27 and effect opening of the switch. The operation of the fluid device is therefore independent of any flow and pressure limitations created by the throttle 63 as respects the general supply conduit and branches reacting respectively on the machine tool element control motors 10 and 11, thus insuring the necessary rapid reaction of the safety piston 27 to movement of valve 66 independent of any reduced flow or pressure conditions created by adjustments of the motor rate determining valve 63, either alone or in connection with the variable resistance rate controls effected by movement of the valve 34.

What is claimed is:

1. A tracer valve structure including a valve block having a bore, a tracer valve slidable in the bore, a tracer supported by the block for movement relative thereto, motion transmitting means intervening the tracer and valve variably to determine the position of the valve in accordance with movements of the tracer, a second valve member mounted in the block in alignment with said tracer valve, a lost motion connection intervening the valve members, a first spring member urging the second valve in the direction of the first, a second spring of less resistance than the first intervening the valve members for urging them into spaced relation, whereby the first valve member is mounted for limited independent movement with respect to the second valve member, a source of hydraulic actuating medium, a first conduit for conducting the medium from the source to the block adjacent the second valve member, a second conduit for conducting the hydraulic medium from the block, a safety pressure switch coupled with said latter conduit, said second valve means having a portion normally blocking flow by way of the valve from said first conduit to said second conduit, and said second valve member being displaceable by the first valve member through the lost motion connection on appreciable displacement of the first valve member to couple said first and second conduits for actuation of the pressure switch.

2. A tracer valve structure including a valve block having a bore, a tracer valve slidable in the bore, a tracer supported by the block for movement relative thereto, motion transmitting means intervening the tracer and valve variably to determine the position of the valve in accordance with movements of the tracer, a second valve member mounted in the block in alignment with said tracer valve, a lost motion connection intervening the valve members, a first spring member urging the second valve in the direction of the first, a second spring of less resistance than the first intervening the valve members for urging them into spaced relation, whereby the first valve member is mounted for limited independent movement with respect to the second valve member, a source of hydraulic actuating medium, a first conduit for conducting the medium from the source to the block adjacent the second valve member, a second conduit for conducting the hydraulic medium from the block, a safety pressure switch coupled with said latter conduit, said second valve means having a portion normally blocking flow by way of the valve from said first conduit to said second conduit, and said second valve member being displaceable by the first valve member through the lost motion connection on appreciable displacement of the first valve member to couple said conduits for actuation of the pressure switch, a return conduit for the hydraulic medium, and means on the second valve member normally connecting the pressure switch coupled conduit with said return conduit.

3. A tracer valve structure as claimed in claim 1 in which both the first valve and the second valve control utilization of the hydraulic actuating medium and in which the pressure source is directly connected to the second valve by said first conduit and is connected through a throttled conduit to the first valve, whereby maximum pressure is available to the second valve independent of the pressure and flow conditions of the first valve.

References Cited in the file of this patent

UNITED STATES PATENTS

| | | |
|---|---|---|
| 2,162,491 | Rosen | June 13, 1939 |
| 2,239,625 | Roehm et al. | Apr. 22, 1941 |
| 2,289,559 | Turek | July 14, 1942 |
| 2,332,532 | Roehm | Oct. 26, 1943 |
| 2,373,332 | O'Neill | Apr. 10, 1945 |